(12) United States Patent
Brammer et al.

(10) Patent No.: US 6,279,381 B1
(45) Date of Patent: Aug. 28, 2001

(54) VIBRATION PICKUP WITH PRESSURE SHEATH

(75) Inventors: Hartmut Brammer, Vaihingen; Uwe Hackel, Gerlinger; Romuald Fries, Weissach; Holger Krebs, Erdmannhausen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/446,284

(22) PCT Filed: Jan. 14, 1998

(86) PCT No.: PCT/DE98/00110
§ 371 Date: Dec. 21, 1999
§ 102(e) Date: Dec. 21, 1999

(87) PCT Pub. No.: WO99/01732
PCT Pub. Date: Jan. 14, 1999

(30) Foreign Application Priority Data

Jun. 30, 1997 (DE) .................................. 197 27 703

(51) Int. Cl.[7] .................................................. G01L 23/22
(52) U.S. Cl. .............................. 73/35.11; 73/654
(58) Field of Search ................... 73/35.11, 35.13, 73/654, 514.34; 310/329

(56) References Cited

U.S. PATENT DOCUMENTS

| 5,398,540 | * | 3/1995 | Entenmann et al. | 73/35.11 |
| 5,872,307 | * | 2/1999 | Brammer et al. | 73/35.11 |
| 5,939,616 | * | 8/1999 | Ito et al. | 73/35.11 |

FOREIGN PATENT DOCUMENTS

| 40 11 910 A | 10/1991 | (DE) . |
| 44 03 660 A1 | 10/1994 | (DE) . |
| 196 12 540 A | 1/1997 | (DE) . |

OTHER PUBLICATIONS

Patent Abstracts of Japan vol. 009, No. 016 (P–329), Jan. 23, 1985 & JP 59 164921 A, Sep. 18, 1984.

* cited by examiner

Primary Examiner—Helen Kwok
(74) Attorney, Agent, or Firm—Michael J. Striker

(57) ABSTRACT

A vibration transducer has a pressure sleeve fastenable directly or indirectly on a structural component part causing vibrations, a sensor element which is held at the pressure sleeve on a radial outer side with an axial pretensioning, a plurality of contact disks including at least one contact disk provided with a radial inclination so as to form a plate spring for generating the axial pretensioning of the sensor element, and a seismic mass provided with an internal thread and screwable directly to the pressure sleeve for clamping the sensor element.

9 Claims, 2 Drawing Sheets

VIBRATION PICKUP WITH PRESSURE SHEATH

BACKGROUND OF THE INVENTION

The invention is directed to a vibration pickup or vibration transducer with a pressure sleeve.

A vibration transducer with a pressure sleeve used as a knock sensor for monitoring the operation of an internal combustion engine in a motor vehicle has already been described in DE-OS 44 03 660. This pressure sleeve is fixedly joined to the structural component part causing the vibrations, in this case, the engine block, via a support area. The vibrations to be detected are knocking noises of the operating internal combustion engine which are conducted via the pressure sleeve to a piezoceramic disk serving as the actual sensor element and accordingly converted into an electric output signal capable of evaluation.

The manner in which this sensor element is arranged on and clamped to the pressure sleeve and the fastening of the pressure sleeve to the vibrating structural component part have a great influence on the method of manufacture. The clamping of the sensor element, including a plurality of individual parts, e.g., a spring and a seismic mass, is carried out in this known vibration transducer by relatively elaborate production steps.

In accordance with the present invention, in a vibration transducer with a pressure sleeve, a seismic mass is provided with an internal thread and is screwable directly to the pressure sleeve for clamping a sensor element of the transducer.

SUMMARY OF THE INVENTION

The vibration transducer, is advantageous in particular in that a separate plate spring for generating axial pretensioning can be dispensed with when joining the individual parts for clamping the sensor element. Since the contact disks which contact the axial surfaces of the piezoceramic sensor element in order to produce electrical contact are already formed in the manner of a plate spring, there is no longer any need for separately producing and mounting a plate spring.

The contact disks can be stamped out from a sheet metal part in a simple manner in such a way that a radially extending curvature or an inclination or slope of the contact disks brings about the springing effect. When stamping out, a connector for connecting a connection cable to the contact disk can also advantageously be provided at the same time, so that this connector is integral with the respective contact disk from the start and a costly assembly step for the electrical connection of these parts can therefore be dispensed with.

The vibration transducer according to the invention can accordingly be produced in a few assembly steps with a reduced number of parts, so that there is no need for special tools for arranging a plate spring or for separate soldered or welded contact connectors. This not only saves on manufacturing costs and manufacturing time, but also increases the reliability of manufacture through the simplified construction.

In another advantageous embodiment form, a separate threaded ring or other fastening means by which the seismic mass is clamped in can also be dispensed with. In this case, the seismic mass itself is outfitted with an internal thread and, if necessary, with an external hexagon, so that the clamping can be carried out automatically. Accordingly, it is possible to further reduce the parts number, the manufacturing time and the weight while maintaining a high manufacturing quality and manufacturing reliability.

BRIEF DESCRIPTION OF THE DRAWING

Embodiment examples of the vibration transducer according to the invention with a pressure sleeve are described with reference to the drawings.

DESCRIPTION OF THE PREFERRED EMBODIMENTS

Figure 1:
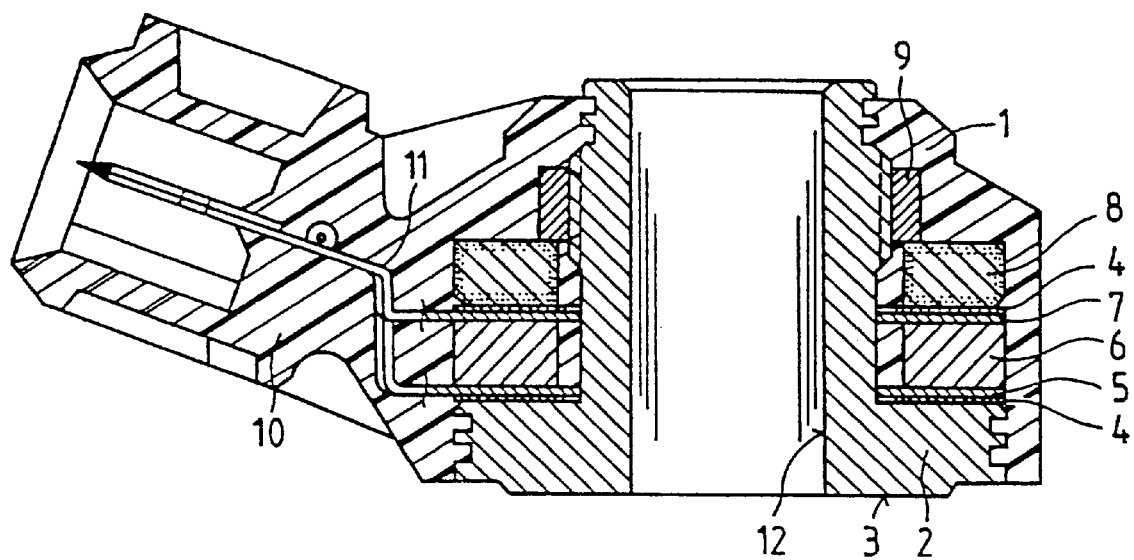
FIG. 1 shows a section through a knock sensor housing as a vibration transducer with a contact disk formed in the manner of a plate spring.

FIG. 1 shows a vibration transducer in the form of a knock sensor for an internal combustion engine with an external plastic housing 1 in which is arranged a pressure sleeve 2 which is supported by its lower surface 3 on the engine block, not shown, whose vibrations are to be detected. Proceeding from the lower edge, the following parts are arranged at the outer circumference of the pressure sleeve 2: an insulating disk 4, a first contact disk 5, a piezoceramic disk 6 serving as the actual sensor element and, above the latter, a second contact disk 7 and a second insulating disk 4. Mounted on this arrangement is a seismic mass 8 which is pressed in the direction of the piezoceramic disk 6 by a ring 9 which can be screwed on or fastened in some other way.

An electrical connection 11 for the contact disks 5 is injection-molded into an integrated connection part 10 of the housing 1 which is produced, in particular, by a plastics injection molding process. The electrical connection 11 is produced in this case so as to be integral with the respective contact disk 5 or 7. In this way, an electrical connection is formed with both sides of the piezoceramic disk 6 via the two contact disks 5 and 7. The electric voltage generated when the piezoceramic disk 6 is acted upon by pressure can be taken off at the connections 11.

A fastening screw, not shown, projects through a central recess or bore hole 12 in the pressure sleeve 2 for fastening this knock sensor in its entirety indirectly or directly to the engine block of the internal combustion engine.

Figure 2:
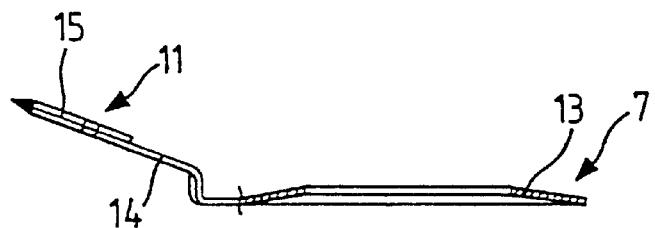
FIG. 2 shows a section through the contact disk according to FIG. 1.
Figure 3:
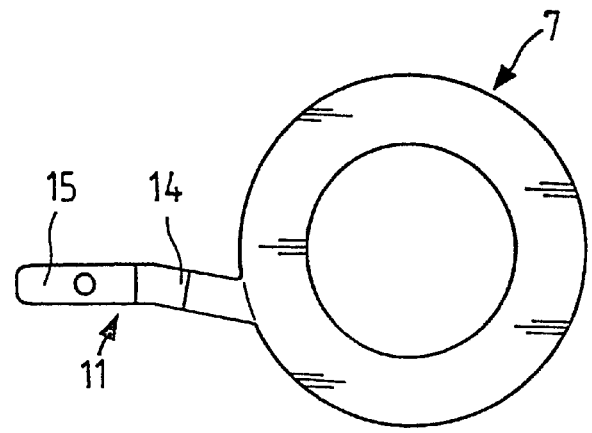
FIG. 3 shows a top view of the contact disk according to FIG. 1.

The second contact disk 7, and, by way of example, the first contact disk 5, is shown in FIG. 2 and FIG. 3. In the same way as contact disk 5, contact disk 7 is provided with a radially extending inclination 13 which causes the respective contact disk 5 or 7 to contact the piezoceramic disk 6 only on the radial inner or outer side and, correspondingly, at the oppositely located insulating disks 4 on the other respective side. The contact disks 5 and 7 are accordingly clamped in between these parts with a predetermined springing action. FIG. 3 shows that the contact disk 7 is stamped out of a sheet metal part in such a way that a crosspiece or web 14 is formed in one piece with the contact disk 7, and the web 14 has a thickened portion 15 in the form of a connector at its end as a result of folding over or crimping additional sheet metal segments, this thickened portion 15 serving as a connection 11 in the form of a plug connector. The contact disk 5 is produced in the same way with correspondingly adapted dimensions of the web 14.

When mounting the knock sensor, the torque exerted by the above-described fastening screw for mounting on the engine block is transmitted in its entirety to the pressure sleeve 2 via the lower surface 3, i.e., no force is exerted by the fastening on the piezoceramic disk 6 serving as sensor element.

In this case, a pretensioning force takes effect due to the pressure of the plate-spring-like contact disks 5 and 7 when mounting the ring 9. The pretensioning force is selected in such a way that the axial forces acting on the piezoceramic disk 6 can be withstood without permanent deterioration of the electric signal and this piezoceramic disk 6 is also extensively independent from thermal expansions and the unavoidable jolting of the pressure sleeve 2 during assembly. The pulses carried out by the seismic mass 8 proportional to the vibrations of the internal combustion engine are converted in the piezoceramic disk 6 into voltage pulses which can be read off at an appropriate measuring device.

Figure 4:
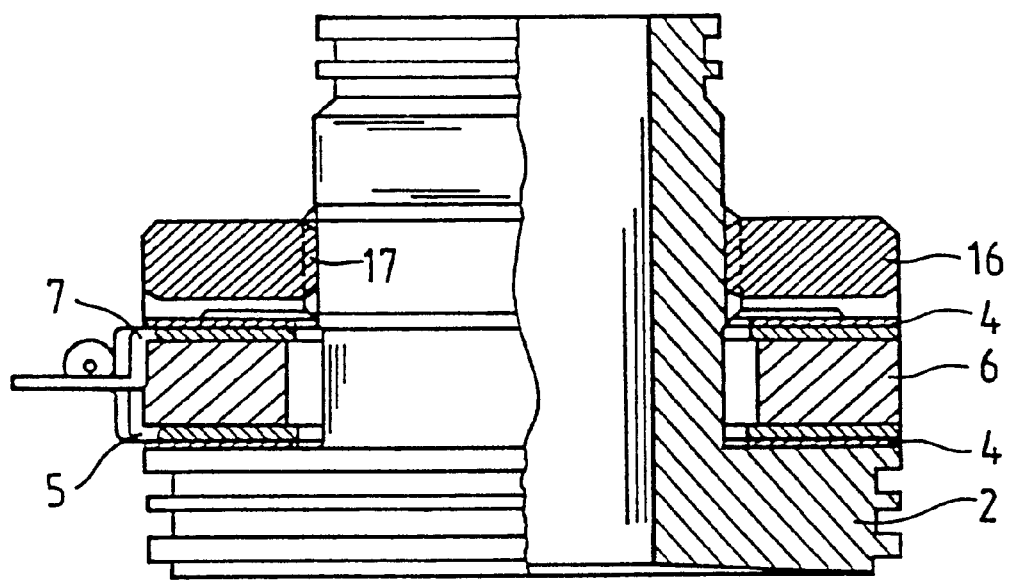
FIG. 4 shows a section through a knock sensor with a seismic mass having an internal thread.

In the embodiment example according to FIG. 4, the parts having the same function as the component elements described with reference to FIGS. 1 to 3 are provided with the same reference numbers. A seismic mass 16 according to FIG. 4 has an internal thread 17 by which it can be screwed directly onto the pressure sleeve 2 and, in so doing, clamps the sensor element 6 between the springing contact disks 5 and 7. A hexagon can be provided on the outside of the seismic mass 16 in order to facilitate mounting. The contact disks 5 and 7 are constructed in the same manner in this embodiment example and are arranged symmetric to one another, so that production is further simplified.

What is claimed is:

1. A vibration transducer, comprising a pressure sleeve fastenable directly or indirectly on a structural component part causing vibrations; a sensor element which is held at said pressure sleeve on a radial outer side with an axial pretensioning; a plurality of contact disks including at least one contact disk provided with a radial inclination so as to form a plate spring for generating the axial pretensioning of said sensor element; and a seismic mass provided with an internal thread and screwable directly to said pressure sleeve for clamping said sensor element.

2. A vibration transducer as defined in claim 1, wherein said at least one contact disk is formed as a sheet metal stamped disk provided with the radial inclination.

3. A vibration transducer as defined in claim 2; and further comprising a web which is formed of one piece with said at least one contact disk, said web having an end which is remote from said at least one contact disk and provided with a thickened portion formed as a plug connector for operating as a connection.

4. A vibration transducer as defined in claim 3, wherein said thickened portion is formed by folded over sheet metal segments.

5. A vibration transducer as defined in claim 3, wherein said contact disks include a second contact disk also having a one-piece web, said at least one contact disk and said second contact disk being identically and arranged symmetrically to one another so that said webs of said contact disks are located at a same height.

6. A vibration transducer as defined in claim 1, wherein said pressure sleeve is composed of steel.

7. A vibration transducer as defined in claim 1, wherein said pressure sleeve is composed of brass.

8. A vibration transducer as defined in claim 1, wherein said pressure sleeve is composed of aluminum.

9. A vibration transducer as defined in claim 1, wherein said pressure sleeve is adapted to be arranged on an engine block of an internal combustion engine in a motor vehicle, which forms the structural component part.

\* \* \* \* \*